United States Patent [19]

Coleman

[11] 4,079,153

[45] Mar. 14, 1978

[54] CURED MEATS

[75] Inventor: Michael Herder Coleman, Putnoe, England

[73] Assignee: Lever Brothers Company, New York, N.Y.

[21] Appl. No.: 729,545

[22] Filed: Sep. 29, 1976

Related U.S. Application Data

[63] Continuation of Ser. No. 632,793, Nov. 17, 1975, abandoned, which is a continuation-in-part of Ser. No. 605,355, Aug. 18, 1975, abandoned, which is a continuation of Ser. No. 551,868, Feb. 21, 1975, abandoned, which is a continuation of Ser. No. 375,267, Jun. 29, 1973, abandoned.

[51] Int. Cl.² ..................... A23B 4/02; A23B 4/14
[52] U.S. Cl. ............................ 426/266; 426/332; 426/545; 426/641; 426/652
[58] Field of Search ............ 426/265, 266, 281, 332, 426/335, 532, 545, 641, 652

[56] References Cited

U.S. PATENT DOCUMENTS

| | | | |
|---|---|---|---|
| 2,553,533 | 5/1951 | Komarik et al. | 426/265 |
| 2,828,212 | 3/1958 | Sair | 426/652 |
| 3,278,308 | 10/1966 | Marco | 426/545 X |

Primary Examiner—Raymond N. Jones
Assistant Examiner—R. A. Yoncoskie
Attorney, Agent, or Firm—Michael J. Kelly; Melvin H. Kurtz; James J. Farrell

[57] ABSTRACT

Formation of carcinogenic nitrosamines when meats such as bacon and ham cured with the use of excess nitrite are grilled or fried is suppressed by introducing a 1, 2-dihydroquinoline into the meat.

8 Claims, No Drawings

CURED MEATS

This is a continuation of application Ser. No. 632,793, filed Nov. 17, 1975, now abandoned, which is a continuation in part of our application Ser. No. 605,355 filed Aug. 18, 1975, which is itself a continuation of our application Ser. No. 551,868 filed Feb. 21, 1975, which is a continuation of our application Ser. No. 375,267 filed June 29, 1973, all now abandoned.

This invention relates to the manufacture of cured meats, and specially those forms of cured meat, such as bacon, that after curing are cooked at high temperature, as by grilling or frying, to prepare them for eating.

In the manufacture of bacon, pork is treated with a curing brine containing an alkali metal nitrite. The salt taken up from the brine has a preservative action, while the nitrite has the distinctive function of reacting with the pigments myoglobin and haemoglobin present in the pork and thus converting them to their nitrosyl derivatives, which give bacon its characteristic colour. It is, however, customary to employ considerably more nitrite than is necessary to bring about substantially complete conversion to the nitrosyl derivatives, for nitrite is specially active against particular food-spoiling microorganisms of the species *Clostridium* and *Salmonella*.

When bacon or other cured meat obtained with the use of excess nitrite is cooked at high temperature, in particular by grilling or frying as distinct say from prolonged immersion in boiling water, the cooked product contains the material N-nitrosopyrrolidine (NNP), a compound known to be a carcinogen, and often also the carcinogenic compound dimethylnitrosamine (DMN). By distilling samples of fried and grilled bacon in steam, we have identified NNP in the volatilised material in amounts corresponding to as much as 50–100 parts per $10^9$. The presence of such material in a foodstuff is clearly undesirable.

The present invention is based on our discovery that the proportion of nitrosamines generated on the cooking at high temperature of cured meats prepared with the use of excess nitrite can be reduced by introducing into the cured meat a 1, 2-dihydroquinoline of the general formula

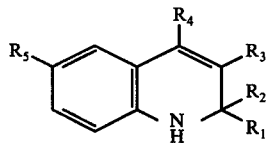

where $R_1$, $R_2$, $R_3$ and $R_4$, which may be the same or different, may be hydrogen or an alkyl group having from 1 to 6 carbon atoms, preferably from one to four carbon atoms, and $R_5$ is an alkoxy group having from one to 12 carbon atoms, preferably from one to four carbon atoms.

Of the above 1, 2-dihydroquinolines which we use as anti-nitrosamine agents, the best known is probably ethoxyquin (6-ethoxy-1,2-dihydro-2,2,4-trimethylquinoline), a substance used as an antioxidant in the treatment of apples and pears and to retard the oxidative deterioration and carotenoids and vitamin E present in forage crops that are to be incorporated in animal feeds. Other compounds within the above general formula are preparable by the condensation of a substituted aniline with a carbonyl compound such as acetone, methyl ethyl ketone, methyl isobutyl ketone and butyraldehyde, in the presence of a catalyst such as iodine, p-toluenesulphonic acid or sulphanilic acid, as described for example in U.S. Pat. No. 3,829,292. Examples of such compounds are:

| $R_1$ | $R_2$ | $R_3$ | $R_4$ | $R_5$ |
|---|---|---|---|---|
| $CH_3$ | $CH_3$ | H | $CH_3$ | $n\text{-}C_3H_7O$ |
| $CH_3$ | $CH_3$ | H | $CH_3$ | $iso\text{-}C_3H_7O$ |
| $CH_3$ | $C_2H_5$ | $CH_3$ | $CH_3$ | $C_2H_5O$ |
| $C_2H_5$ | $CH_3$ | H | $C_2H_5$ | $CH_3O$ |
| H | $n\text{-}C_3H_7$ | $C_2H_5$ | H | $C_2H_5O$ |
| $n\text{-}C_3H_7$ | $CH_3$ | H | $n\text{-}C_3H_7$ | $C_2H_5O$ |
| $CH_3$ | $CH_3$ | H | $CH_3$ | $n\text{-}C_{12}H_{25}O$ |
| $CH_3$ | $CH_3$ | H | $CH_3$ | $CH_3O$ |

The compounds whose use is within the scope of the present invention do not significantly affect the nitrosyl pigments of the cured meat, and so do not appreciably affect its colour. Additionally, the compounds do not react with excess nitrite, so leaving the nitrite undestroyed to exert its powerful anti-bacterial action. The mechanism by which the compounds interfere with the formation of carcinogenic nitrosamines at high temperature is obscure. It does not appear to be an antioxidant effect, for we have found that those antioxidants (for example mixed tocopherols, d-isoascorbyl palmitate, and nordihydroguaiaretic acid) which have been proposed for use in inhibiting the development of rancidity in bacon have very little or no effect in inhibiting nitrosamine formation. Similarly, we have found that the approved food antioxidants propyl gallate, butylated hydroxyanisole and butylated hydroxytoluene have very little effect in reducing nitrosamine formation.

The anti-nitrosamine compound is suitably introduced in an amount forming from about 5 to about 250, and preferably from about 5 to about 100, parts per $10^6$ of the cured meat, though as little as 1 part per $10^6$ of the cured meat has a useful effect. It is most conveniently introduced into the meat during the curing operation, although it may if desired be introduced before or after curing. So as not to disturb unduly the distribution of salt in the bacon or other cured meat, the anti-nitrosamine compound may be dispersed in brine before being brought into contact with the meat. The brine/reagent dispersion may be injected into the meat, or the meat may be immersed in the dispersion. Treatment is conveniently carried out at the temperatures usually employed in bacon curing procedures, for example at 5°–10° C, but higher or lower temperatures can be used if desired.

The invention can be applied in the production of bacon by the well-known brine-injection procedure and by slice-cure procedures, such as that described in U.S. Pat. No. 2,974,047. As described in Example 1 later in this specification, it can very conveniently be applied in a bacon-curing procedure in which sliced frozen pork is enclosed in a pack with brine containing an amount of nitrite such as will leave free nitrite, suitably in an amount forming 10–200 parts per $10^6$ of the meat, after the formation of the desired bacon colour; and the pack is sealed in vacuo and the cure is allowed to proceed, suitably by storage at room temperature. The salt content of bacon cured by this procedure, as of bacon cured by the known procedures, is usually in the range of 3–10% sodium chloride weight/weight of aqueous phase of the cured meat.

The invention can also be applied to the reduction of nitrosamine-forming capacity in chopped pork and ham products, and burgers.

The invention is further illustrated by the following Examples.

EXAMPLE 1

Sixteen lots of three slices (slice thickness 4mm) of frozen (−2°C) pork, the three slices together weighing 100g, were packed in air-impermeable pouches of polyethylene/cellulose laminate together with (in each pouch) 20 ml of a curing brine containing 30% w/v salt and 24 mg of sodium nitrite.

To each of eight of the pouches there was added 0.2 ml of a 5% w/v solution of ethoxyquin (the pure liquid form sold by Monsanto under the Registered Trade Mark SANTOQUIN is very suitable) is isopropanol; and to each of the other eight pouches there was added 0.2 ml of isopropanol alone.

All 16 pouches were then evacuated and sealed, and kept for three days at room temperature to allow curing to proceed. The pouches were then opened. The contents had a good cured colour.

Those slices that had been treated with ethoxyquin were found, following generally the method of van Deren and Jaworski in *J. Assoc. Off. Anal. Chemists* 1968, 51 No. 3 p. 537 to have an ethoxyquin content of 5–10 parts per $10^6$ of cured meat. After part of the contents of each pouch had been conventionally analysed for nitrite content, the remainder was grilled. Each slice was given 4 minutes grilling on one side, and 2 minutes on the other, under an electric grill of the kind commonly used in households. (It was noted that the temperature of the fat part of each slice rose to over 170° C, whereas the lean part, which contained proportionately much more water, reached a temperature of no more than about 110° C).

The cook-out fat (fat rendered from the bacon) was collected and analysed for volatile nitrosamines by the method of Bryce and Telling, *J. Ag. Food Chem.* 1972, 20 No. 4 p. 910. The results, which are shown in the table below together with those from three further experiments each involving 16 lots of three slices, illustrate the very marked reduction in the amount of nitrosamines generated in the presence of added ethoxyquin.

Table

| Pork sample | Control Series | | | With 0.01% w/w Ethoxyquin | | |
|---|---|---|---|---|---|---|
| | Nitrite (ppm)* | Nitrosamines (ppb)* DMN | NNP | Nitrosamines (ppb)* NNP | DMN | Nitrite (ppm)* |
| A | 77 | 1.6 | 36.7 | 1.0 | 0.1 | 56 |
| B | 97 | 4.8 | 25.0 | 3.8 | 0.6 | 99 |
| C | 62 | 3.5 | 50.0 | 3.5 | 0.4 | 72 |
| D | 105 | 4.3 | 29.0 | 4.3 | 0.6 | 127 |

*ppm = parts per $10^6$ of cured meat
ppb = parts per $10^9$ of cured meat

Experiments carried out under substantially identical conditions to those just described but with the use of 0.01% concentration of the food antioxidants referred to earlier in this specification (tocopherols, nordihydroguaiaretic acid & c) instead of ethoxyquin showed no or very little reduction in the proportion of nitrosamines generated.

Additionally, bacon prepared from pigs that had been fed on a diet that was conventional apart from the inclusion in it of a relatively high proportion (5000 parts per $10^6$ of feed) of ethoxyquin showed no significant difference from ordinary bacon in the proportion of nitrosamines generated on grilling or frying.

EXAMPLE 2

Following generally the procedure of Example 1, the following 1,2-dihydroquinolines can be used to reduce the formation of nitrosamines on grilling or frying bacon containing excess nitrite. Levels of incorporation of the anti-nitrosamine agent are preferably in the range 5 – 100 parts per $10^6$ of cured meat.

1,2-dihydro-2,2,4-trimethyl-6-n-propoxyquinoline
1,2-dihydro-2,2,4-trimethyl-6-isopropoxy-quinoline
1,2-dihydro-2,3,4-trimethyl-2-ethyl-6-ethoxyquinoline
1,2-dihydro-2,4-diethyl-2-methyl-6-methoxyquinoline
1,2-dihydro-2-n-propyl-3-ethyl-6-ethoxyquinoline
1,2-dihydro-2-4-di-n-propyl-2-methyl-6-ethoxyquinoline
1,2-dihydro-2,2,4-trimethyl-6-n-dodecyloxyquinoline
1,2-dihydro-2,2,4-trimethyl-6-methoxyquinoline

What is claimed is:

1. In a process for the production of a cured meat which comprises treating the meat with alkali metal nitrite under conditions such as to leave in the cured meat an excess of nitrite over that which reacts with the pigments of the meat, the improvement which consists in introducing into the meat a 1,2-dihydroquinoline of the general formula

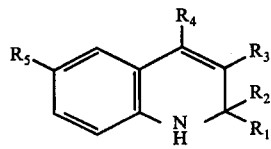

where $R_1$, $R_2$, $R_3$ and $R_4$ may be hydrogen or an alkyl group containing from 1 to 6 carbon atoms, and $R_5$ is an alkoxy group containing from 1 to 12 carbon atoms, said 1,2-dihydroquinoline being introduced in an amount effective to reduce the formation of carcinogenic nitrosamines from the excess nitrite when the cured meat is grilled or fried.

2. A process according to claim 1, wherein the 1,2-dihydroquinoline introduced forms from about 5 to about 250 parts per $10^6$ of the cured meat.

3. A process according to claim 2 wherein the 1,2-dihydroquinoline introduced forms from about 5 to about 100 parts per $10^6$ of the cured meat.

4. A process according to claim 1, wherein $R_1$, $R_2$, $R_3$ and $R_4$ are hydrogen or an alkyl group containing from 1 to 4 carbon atoms, and $R_5$ is an alkoxy group containing from 1 to 4 carbon atoms.

5. A process according to claim 1, wherein the 1,2-dihydroquinoline is ethoxyquin.

6. A cured meat containing excess alkali metal nitrite in an amount up to about 200 parts per $10^6$ of the meat, and containing per $10^6$ of the meat from about 5 to 250 parts of a 1,2-dihydroquinoline of the general formula

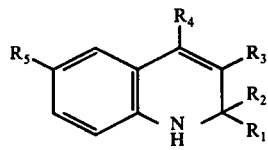

where $R_1$, $R_2$, $R_3$ and $R_4$ may be hydrogen or an alkyl group containing from 1 to 6 carbon atoms, and $R_5$ is an alkoxy group containing from 1 to 12 carbon atoms.

7. A cured meat according to claim 6, wherein $R_1$, $R_2$, $R_3$ and $R_4$ are hydrogen or an alkyl group containing from 1 to 4 carbon atoms, and $R_5$ is an alkoxy group containing from 1 to 4 carbon atoms.

8. Bacon containing excess alkali metal nitrite in an amount up to about 200 parts per $10^6$ of the bacon and containing from about 5 to about 100 parts of ethoxyquin per $10^6$ of the bacon.